No. 737,390. PATENTED AUG. 25, 1903.
C. L. GOEHRING & W. TROCHE.
GLASS GRINDING MACHINE.
APPLICATION FILED JUNE 7, 1902.
NO MODEL. 3 SHEETS—SHEET 1.
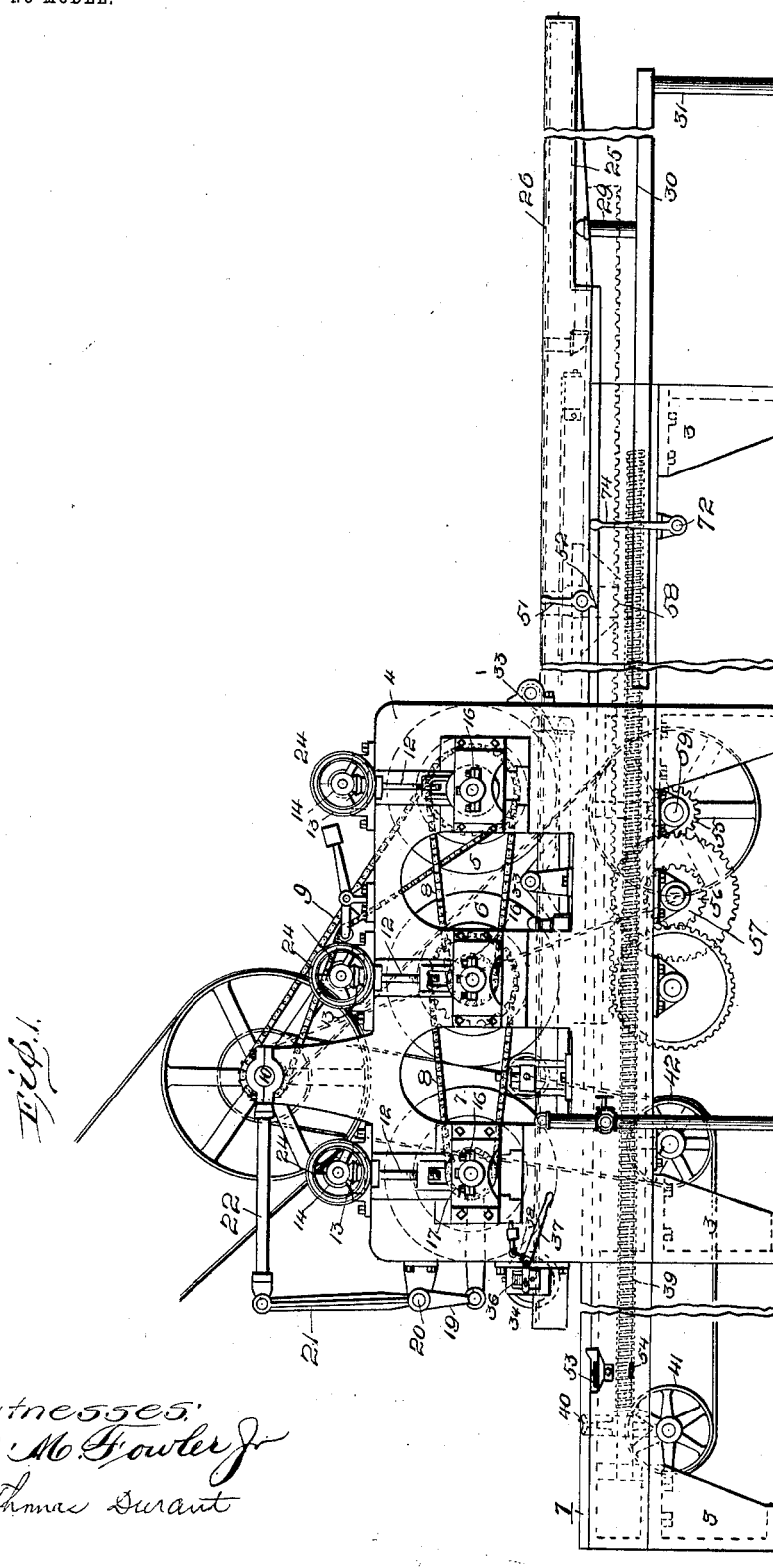

No. 737,390. PATENTED AUG. 25, 1903.
C. L. GOEHRING & W. TROCHE.
GLASS GRINDING MACHINE.
APPLICATION FILED JUNE 7, 1902.
NO MODEL. 3 SHEETS—SHEET 2.
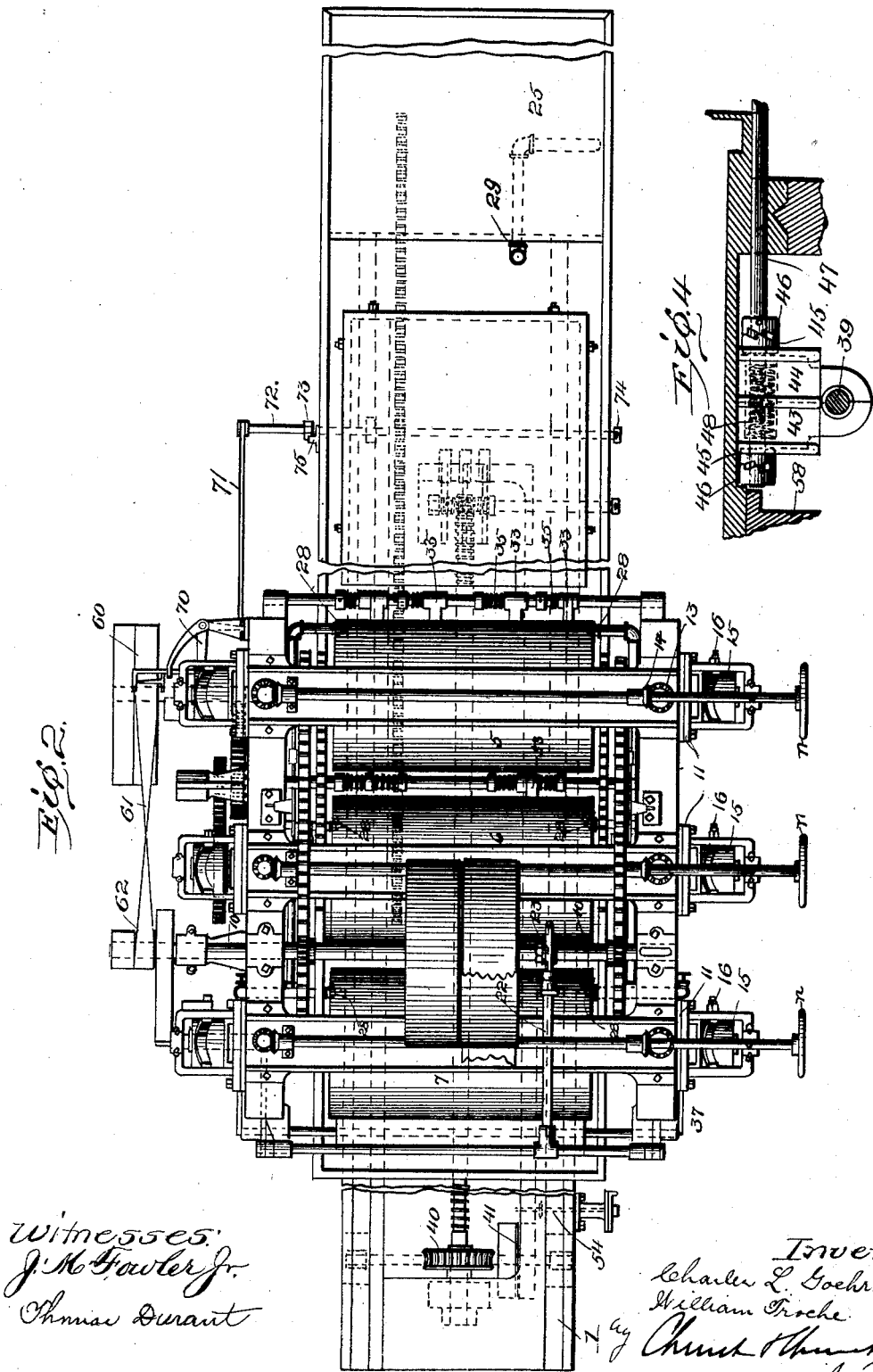

No. 737,390. PATENTED AUG. 25, 1903.
C. L. GOEHRING & W. TROCHE.
GLASS GRINDING MACHINE.
APPLICATION FILED JUNE 7, 1902.
NO MODEL. 3 SHEETS—SHEET 3.
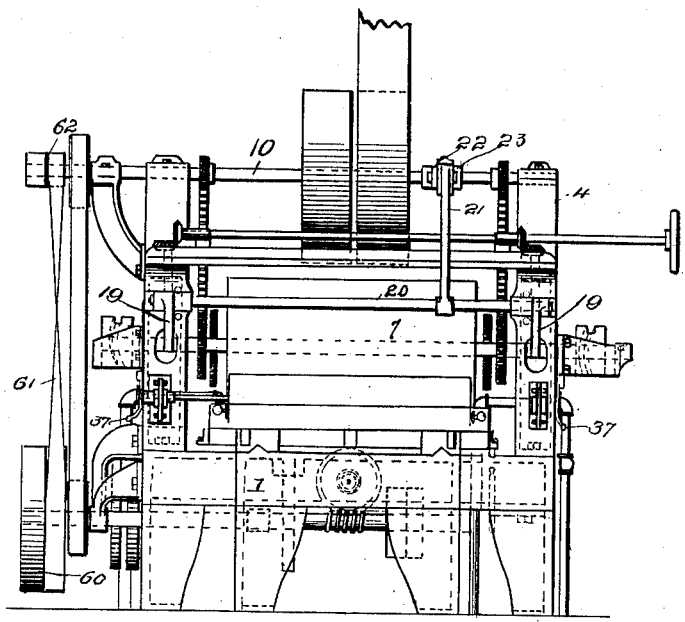
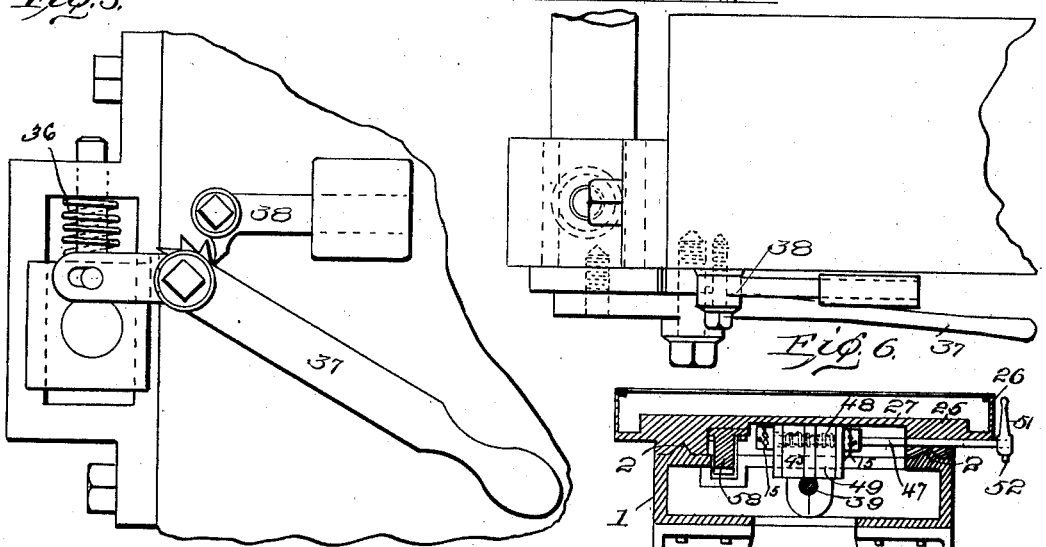
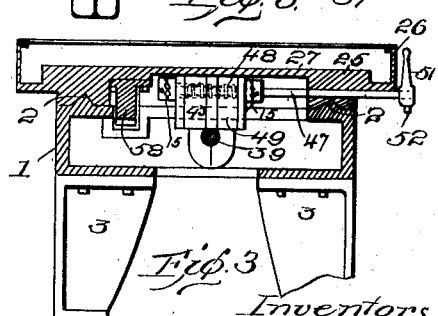

No. 737,390. Patented August 25, 1903.

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-GRINDING MACHINE.

SPECIFICATION forming part of Letters Patent No. 737,390, dated August 25, 1903.

Application filed June 7, 1902. Serial No. 110,659. (No model.)

*To all whom it may concern:*

Be it known that we, CHARLES L. GOEHRING and WILLIAM TROCHE, citizens of the United States, and residents of Akron, in the county of Summit and State of Ohio, have invented certain new and useful Improvements in Glass-Grinding Machines; and we do hereby declare the following to be a full, clear, and exact description of the same, reference being had to the accompanying drawings, forming a part of this specification, and to the figures of reference marked thereon.

This invention relates to glass-grinding machinery, the objects of the invention being to provide means whereby the glass may be ground rapidly with a minimum percentage of breakage and with a but a single handling.

With these objects in view the invention consists in certain novel details of construction and combinations and arrangements of parts, as will be described, and pointed out particularly in the claims appended hereto, and each is capable of an independent use, either separately or in connection with other grinding apparatus, as will be readily understood by those skilled in the art.

Referring to the accompanying drawings, Figure 1 is a side elevation of a plate-glass-grinding apparatus embodying the present improvements. Fig. 2 is a top plan view of the same. Fig. 3 is a transverse section of the carriage with the sectional feed-nut in elevation. Fig. 4 is an elevation, on an enlarged scale, of the feed-nut and its operating mechanism. Figs. 5 and 6 are details of the lifting mechanism for the end presser-roll. Fig. 7 is an elevation looking at the left-hand end, Fig. 1.

Like numerals of reference in the several figures indicate the same parts.

The machine illustrated in Figs. 1 to 7 as embodying the present invention resembles in general characteristics a metal-planing machine—that is to say, there is a bed having longitudinal ways and a work-holding carriage adapted to be reciprocated on the ways. Above the carriage are a series of pressers for holding the work down in position and a grinder or series of grinders driven by suitable power appliances and adjustably supported in position to operate on the surface of the work or glass carried by the carriage. As illustrated, the carriage supports a tank in which the work is placed with its surface below the water-level, and means are preferably provided for directing currents of water over the surface immediately in front of the grinder for the purpose of carrying away any foreign matter or grindings and presenting a clean surface to each succeeding grinder.

If reference be had to Figs. 1, 2, 3, and 7, it will be seen that a relatively long bed 1 is provided having suitable ways or tracks 2 thereon, such bed being supported by legs or other framing 3 and in turn supports the superstructure or grinder-frame 4. The latter preferably extends over the carriage-way and is adapted to support the driving and grinder-operating mechanisms.

In the preferred apparatus a series of grinders are employed, three being shown. The first to operate is a very coarse rougher 5, the second, 6, a medium-grade grinder, and the third, 7, a very fine finisher. Each grinder is a cylinder of somewhat greater length than the width of the glass to be ground and preferably driven by sprocket-wheels and chains 8, connecting them, and a drive-chain 9, leading from the rougher to the drive-shaft 10. Each succeeding grinder is preferably driven at a higher rate of speed than the preceding one—that is to say, the sprocket-wheels are of such relative diameters that the finer the grinder the more rapid the movement and the more perfect the finish imparted thereby. Each of the grinders is supported in journal-boxes 11, guided by the frame 4 and supported by screws 12, having miter-gears 13 at the upper ends. The gears at the ends of each grinder are connected by a cross-shaft and gears 14, whereby each grinder may be adjusted vertically by hand-wheels 24 and at the same time its parallelism with the bed maintained. Each grinder is furthermore given a movement longitudinally of its axis, such movement being preferably imparted by collars 15, secured to the ends of the grinder-shafts and having cam-grooves therein, with which suitable pins 16 on the boxes 11 coöp- erate. This is shown clearly in Fig. 2, and it will be understood that as the grinders rotate they will reciprocate longitudinally of their axes. In addition the finishing-grinder is also preferably given a reciprocation at right angles to its axis and parallel with the work-feed, for which purpose its boxes 11 slide horizontally in supplemental boxes 17, Fig. 1, the latter being supported by the screw 12. Said boxes 11 are connected by links 18 with arms 19 on a rock-shaft 20. The latter has an upwardly-extending arm 21, connected by a link and strap 22 with an eccentric 23 on the drive-shaft 10. The sprocket-chain connecting the grinders 6 and 7 has sufficient slack to permit of the desired movement of the grinder 7, which movement, it will be understood, is slight. The length of the grinders with relation to the width of the work is such that in their movements longitudinally of their axis the ends of the grinder will never move inwardly past the edge of the work, and hence the glass is acted on simultaneously throughout its entire width.

The carriage, which reciprocates on the ways 2 beneath the grinders, is in the type of machine illustrated of sufficient length for a portion of it to remain under the grinders at all times. The carriage is numbered 25 in the accompanying drawings, and it carries a long tank the side walls 26 of which extend upwardly on each side of the grinders and at each end of the tank to a point above the grinding-level of the work, the latter being supported on a flat bed or support 27 within the tank. Suitable channel ways or grooves are preferably provided at each side and, if so desired, at the ends for catching grit or carrying away the heavier particles, which would naturally settle to the bottom of the tank during the grinding operation.

The tank preferably receives its supply of water through nozzles 28, Figs. 1 and 2, arranged between the grinders and directed toward the succeeding grinder during the forward movement of the carriage, whereby the work is cleaned by the currents generated in the tank by the nozzles, and such surface is left clean and free of any grit from the previous grinder. The overflow is carried off through an overflow-pipe 29, depending at its lower end into a drip pan or trough 30, extending longitudinally of the bed a sufficient distance to permit of the necessary travel of the carriage and from which the water is conducted away by an outlet 31, leading to any suitable waste-pipe.

Glass mounted on the platform 27 of the carriage may be suitably positioned by clips 32 or otherwise held to prevent it from sliding longitudinally of its platform, and it is held down on said platform by suitable presser-feet 33, arranged in front of the grinders 5 and 6, and by suitable pressure-rollers 34, arranged in front and rear of the grinder 7. The presser-feet 33 are held down by suitable springs 35, Fig. 2, while the rollers are preferably provided with heavy elastic or rubber faces and in addition are held down by springs 36, the rearmost roller 34, however, being provided with elevating mechanism consisting of levers 37, pivoted to the frame 4, with pawls 38 (see Figs. 5 and 6) for holding the levers in adjusted position with the roller elevated whenever the work is to be removed.

It will be understood that in accordance with the design of the present apparatus the work is to be finished by a single passage in one direction beneath the grinders, although, if found desirable or necessary, one or more of the grinders may be elevated out of operative position and the work passed one or more times beneath the other or others; but such use is not contemplated nor in our opinion desirable save for special purposes.

To secure a steady, uniform, and powerful feed of the carriage during the grinding operation and quick return of the carriage after the grinding operation has been performed and the work removed, a screw-feed is preferably provided for advancing the carriage and a more rapid spur-gear feed for moving it in the opposite direction. The screw-feed consists of a relatively long feed-screw 39, adapted to be rotated continuously by a worm gear and wheel 40, the worm-wheel being driven through pulleys 41 42, and suitable belting connecting the same, and a pulley on the drive-shaft 10, as clearly shown in Fig. 1. The carriage is adapted to be connected with said screw for forward movement by a split nut. (Shown generally in Figs. 1 and 2 and illustrated in detail in Figs. 3 and 4.) This split nut consists of two sliding sections 43 and 44, adapted to be moved toward each other to embrace the feed-screw by inclines or cam-faces 45 on said sections and coöperating inclines or cams 46 on a shaft 47. The shaft 47 extends out at one side of the carriage and is adapted to be moved in one direction or the other to open or close the sections of the feed-nut by a handle 51. Thus when the handle 51 is moved toward the right, Fig. 1, said nuts will be thrown into engagement with the screw; but if said handle be then moved in the opposite direction the nut-sections will be automatically disengaged from said screw by the spring 48, located on the shaft 47 between the sections of the nut. Any desired tripping mechanism may be provided for turning the handle to automatically stop or reverse the feed. As shown, the handle is adapted to be tripped by a projection on the bed. This projection or stop 53 is adjustably mounted on the machine-bed, as shown in Fig. 1, and is adapted to engage the projection 52 on the handle. To arrest the movement of the screw, the pulleys 41 and 42 may be arranged in pairs, with one loose pulley and a belt-shifter 54, provided for shifting the belt back and forth, this arrangement being the well-known expedient for this purpose and is shown simply to indicate that, where desired, the screw-feed may be thrown out of action entirely and the spur-gear feed utilized.

The spur-gear feed referred to preferably consists of a train of gear-wheels 55, 56, and 57, a gear driven by the latter meshing with a rack 58 on the under side of the carriage. The gear 55 is mounted on a shaft 59, and the latter at one end carries fast and loose pulleys 60, over which a crossed belt 61 runs up to a pulley 62 on the drive-shaft 10. By shifting the belt 61 the gear-feed may be thrown into or out of action, as desired. Thus when the screw-feed is to be utilized the gear-feed is thrown out of action; but when the carriage is to be returned to starting position the belt is shifted and the gear-feed thrown into action, thereby running the carriage back rapidly. Mechanism is shown for automatically arresting the spur-gear feed when the carriage has reached first position, consisting of a belt-shifter 70, pivoted on the main frame and connected by a rod 71 with an arm on a rock-shaft 72. The rock-shaft is provided with arms 73 74, whereby it may be moved by hand or adapted to be struck by a projection 75 on the carrirge when the latter reaches first position.

Practice has demonstrated that by grinding the glass with the grinding-point beneath the surface of the water the grinding operations may be forced to a speed considerably above that which is possible where the water is simply flushed onto the surface of the work and grinder, and, furthermore, when the work is immersed at the grinding-point it is found that the liability of breakage is reduced to a minimum and may be practically ignored so far as breakage due to the action of the grinder is concerned.

In operating the machine illustrated in Figs. 1 to 6 the carriage is moved to the extreme right and the glass plate or casting is secured in position on its support, preferably with an interposed elastic or rubber pad. This having been done and the grinders adjusted, the first to make a rough strong cut, so as to reduce the whole surface of the plate to a uniform level, the second to remove the rough abrasions of the first, and the third to give a finish to the surface, the grinders are started and water is let into the tank in sufficient quantity to fill said tank to a point above the top surface of the glass and preferably to cover said glass to quite a depth. The lever for operating the feed-nut is then turned and the carriage commences its forward movement. During its forward travel the glass is held down firmly by the pressers and presser-rollers, thereby preventing the springing or opening up of the same under the action of the rollers and incidentally preventing the entry of material beneath the glass or between the glass and its platform or support. Grindings from the rollers are immediately swept transversely into the sides of the tank and settle down into the side depressions, being thence carried back out of the way and may be removed by any suitable means when the machine has completed the grinding operation. After the glass has passed beneath the grinders and the carriage brought to rest by the tripping of the latch 52 the rear presser-roller is elevated by depressing the handles of the levers 37, thereby freeing the glass from any restraint, and it may be removed for subsequent manipulation. The carriage is then run back by the gear-feed to the starting position.

In beveling or edging the grinder and work are manipulated in any preferred or ordinary manner, care being taken, however, that during the continuance of the grinding operation the grinding-point shall at all times be immersed in the water and that the water cover the plate as far as practicable.

Having thus described our invention, what we claim as new, and desire to secure by Letters Patent, is—

1. In a glass-grinding apparatus, the combination with a glass-support and means for feeding said support, of a rotary grinder, bearings in which said grinder is mounted having guideways extending parallel with the plane of movement of the glass-support at right angles to the axis of the grinder, mechanism for moving said grinder in said ways, guides for said bearings extending at right angles to the plane of movement of said support and adjusting mechanism for moving said bearings toward and from the support; substantially as described.

2. In a glass-grinding apparatus, the combination with a series of grinders acting successively on the glass to be ground, said grinders being respectively of coarse and fine abrading material, of a driving mechanism for rotating the grinders formed of fine abrading material at a higher rate of speed than the grinders formed of coarser abrading material; substantially as described.

3. In a glass-grinding apparatus, the combination with a glass-support and a series of grinders acting successively on the glass carried by said support, of a driving mechanism for one of the grinders and gearing interposed between said grinder and the succeeding grinders, such gearing being proportioned to rotate the succeeding grinders at higher speed; substantially as described.

4. In glass-grinding apparatus, the combination with a series of grinders, a glass-support traveling beneath the said grinders, and a tank in which said glass-support is located, of water-supply nozzles arranged between the grinders for cleaning the surface of the glass prior to its presentation to each of the succeeding grinders; substantially as described.

5. In a glass-grinding apparatus, the combination with a series of grinders, a glass-carrier mounted to move beneath the said grinders and a tank surrounding said support having its side walls extending above the level of the grinding-point, of nozzles for supplying liquid to said tank located intermediate the grinders whereby cleansing-currents are established in the tank between the grinders for removing the debris from the surface prior to the presentation of said surface to the succeeding grinders; substantially as described.

6. In glass-grinding apparatus, the combination with a series of grinders, a carriage traveling beneath said grinders and a glass-support mounted on said carriage, of presser-feet located adjacent said grinders for holding the glass down on its support and springs for maintaining said presser-feet in contact with the glass; substantially as described.

7. In a glass-grinding apparatus, the combination with a grinder, a carriage mounted to travel beneath said grinder, a glass-support mounted on said carriage and driving mechanism for said grinder and carriage, of presser-rolls having elastic faces located on opposite sides of said grinder, and adapted to contact with the glass for holding it down on its support while being acted upon by the grinder; substantially as described.

8. In a glass-grinding apparatus, the combination with a reciprocatory carriage, a rotary grinder and means for reciprocating said carriage and rotating the grinder, of a presser-roll located adjacent to said grinder for holding the glass down on its support, a spring for holding said presser-roll in operative position and an elevating mechanism for moving the roll out of contact with the glass against the tension of its spring; substantially as described.

9. In a glass-grinding apparatus, the combination with a glass-support, of a rotary grinder supported to move bodily in a direction at right angles to its axis in the plane of the surface being ground and driving mechanism for rotating said grinder and periodically moving the same bodily at right angles to its axis; substantially as described.

CHARLES L. GOEHRING.
WILLIAM TROCHE.

Witnesses:
P. FANNY FALOR,
H. S. FALOR.